United States Patent [19]

Starkey et al.

[11] Patent Number: 5,358,205
[45] Date of Patent: Oct. 25, 1994

[54] DEVICE TO CONNECT I.V. POLE AND PATIENT SUPPORT

[76] Inventors: Douglas G. Starkey, N. 9022 Cedar Rd., Spokane, Wash. 99208; Paul Skaggs, S. 104 Freya, Spokane, Wash. 99202

[21] Appl. No.: 46,815

[22] Filed: Apr. 16, 1993

[51] Int. Cl.$^5$ .............................. A47B 96/06
[52] U.S. Cl. ............... 248/225.31; 248/230; 248/231.5; 248/222.3; 248/229
[58] Field of Search ............ 248/225.31, 228, 229, 248/230, 231.5, 231.8, 222.1, 222.2, 222.3, 316.1, 316.7

[56] References Cited

U.S. PATENT DOCUMENTS

| | | |
|---|---|---|
| 837,642 | 12/1906 | Powell . |
| 1,808,328 | 6/1931 | Thomson . |
| 1,845,365 | 2/1932 | Thomson . |
| 1,906,369 | 5/1933 | Christie . |
| 2,496,478 | 2/1950 | Kinnebrew . |
| 2,631,807 | 3/1953 | Witt . |
| 2,696,963 | 12/1954 | Shepherd . |
| 2,814,455 | 11/1957 | Rainey ................. 248/229 |
| 3,003,735 | 10/1961 | Havener ................ 248/228 |
| 3,709,372 | 1/1973 | Alexander . |
| 3,709,556 | 1/1973 | Allard et al. . |
| 4,006,877 | 2/1977 | Van Niel ............ 248/223.3 X |
| 4,190,224 | 2/1980 | LeBlanc ................ 248/229 |
| 4,227,667 | 10/1980 | Dickerson . |
| 4,323,215 | 4/1982 | Berger ............... 248/222.2 X |
| 4,328,915 | 5/1982 | Melton, III ............ 248/229 X |
| 4,422,609 | 12/1983 | Clark .................. 248/228 |
| 4,511,157 | 4/1985 | Wilt, Jr. . |
| 4,511,158 | 4/1985 | Vargas et al. . |
| 4,593,422 | 6/1986 | Wopert, Jr. et al. ..... 248/229 X |
| 4,887,784 | 12/1989 | Kayali ............... 248/231.5 X |

FOREIGN PATENT DOCUMENTS

| | | |
|---|---|---|
| 743120 | 12/1943 | Fed. Rep. of Germany . |
| 1101910 | 11/1955 | France . |
| 1286788 | 1/1961 | France . |
| 448202 | 3/1968 | Switzerland . |

*Primary Examiner*—Ramon O. Ramirez
*Assistant Examiner*—Derek J. Berger
*Attorney, Agent, or Firm*—Keith S. Bergman

[57] ABSTRACT

A connector is disclosed to releasably attach a horizontal tubular element of a mobile patient support and a vertical tubular element of an intravenous infusion apparatus (I.V.) support apparatus having wheels for locomotion. The connector provides a medial body rigidly carrying an adjustably fastenable I.V. support fastening arm extending therefrom in a first direction and pivotally carrying a patient support structure fastening arm comprises a bracket extending in a second opposite direction. The patient support structure fastening arm defines a fastening channel in its outer part and is biased to a fastening mode by spring means extending between the fastening the arm and the body.

3 Claims, 1 Drawing Sheet

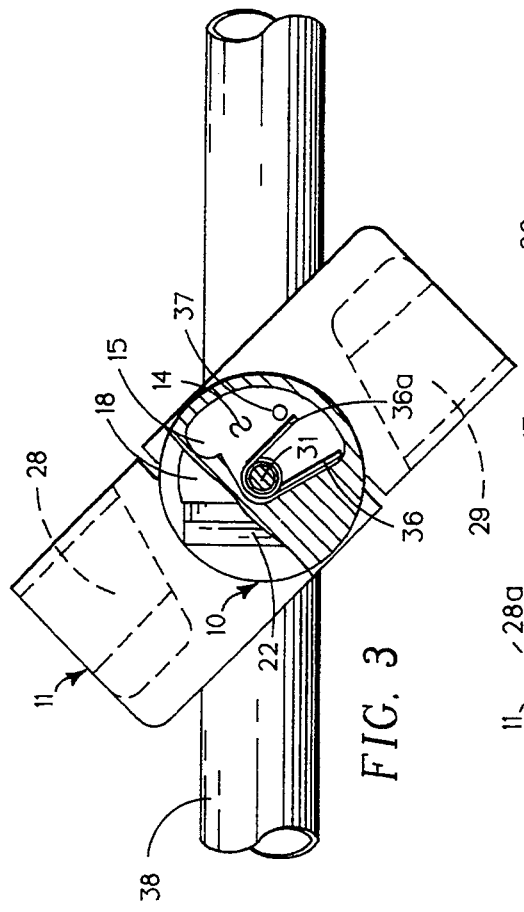
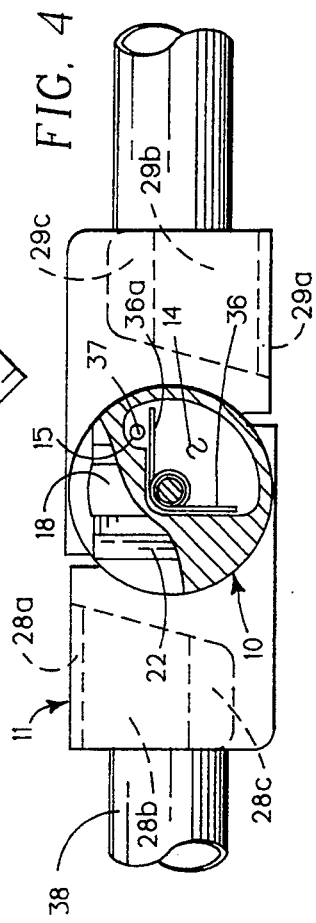
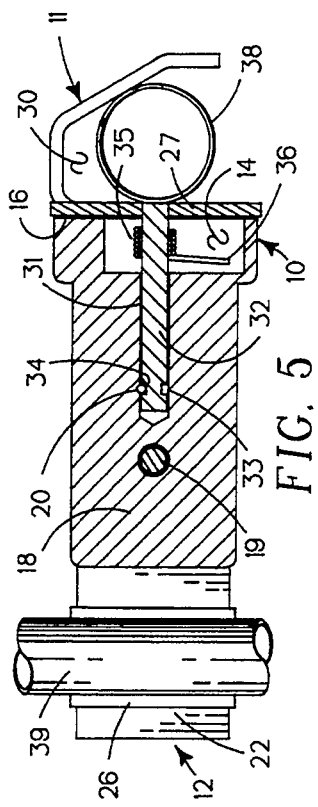
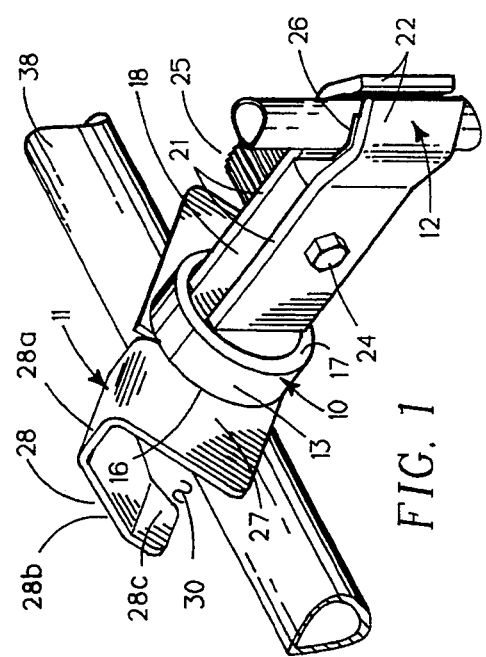
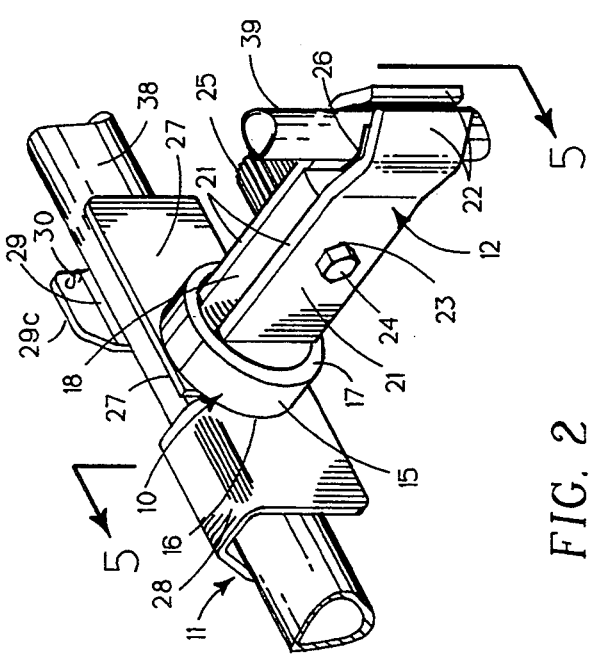

DEVICE TO CONNECT I.V. POLE AND PATIENT SUPPORT

BACKGROUND OF INVENTION

Related Applications

There are no applications related hereto heretofore filed in this or any foreign country.

Field of Invention

This invention relates generally to a connector for vertical supports for intravenous (I.V.) infusion apparatus and horizontal elements of patient supports, and more particularly to such a connector having opposed support arms pivotally interconnected for release and attachment.

Background and Description of Prior Art

In institutional settings it is often necessary to simultaneously move both a mobile patient support device and a mobile intravenous support servicing the same patient. Generally this function has been accomplished manually but not without at least potential difficulty, as if the two mobile structures are not interconnected, one hand of a person moving them must be devoted to each device and this prevents any patient care, the opening doors, pressing of elevator buttons or the like without releasing one or the other of the mobile structures. The situation not only may be inconvenient for a mover but may also create dangers or hazards, not only for the patient but also for the person moving the patient or possibly even third parties. The instant device seeks to provide a new and novel connector to solve this problem.

The problem has heretofore been recognized and responsively various devices have become known to interconnect patient supports, usually beds, gurneys, or wheel chairs, and mobile I.V. support apparatus. These devices generally have fallen into one of two distinguishable classes: the first providing an I.V. vertical support that has no individual mobile support, but rather is fastened directly to some part of the structure of the patient support device so that the I.V. support becomes a part of the patient support device and is mobile only by reason of being a part of that device; and a second class that maintains the individual mobile nature of the I.V. support apparatus, but provides a rigid linkage interconnecting a vertical element of that device, generally at a predetermined spaced distance from the patient support. The first class of device commonly provides a pole-like structure that necessarily extends upwardly a substantial distance above a patient supporting surface and in so doing provides an element that often interferes with patient care or activity. This is especially true in the case of a mobile patient bed on which patients are commonly transported but which normally has no other structures extending any substantial distance above the surface supporting the patient. The second class of supports also present problems in that they maintain the I.V. support structure at a substantial distance from the interconnected patient support and commonly in a fixed position relative thereto so that the interconnected structures are often difficult to install and move and have a higher potentiality of running into other objects during motion of the interconnected devices. It can be seen that notwithstanding prior development of connectors of the type discussed, problems still remain with such known devices. The instant invention seeks to resolve those problems by providing a connector that is not completely within the ambit of either class discussed to alleviate the problems associated with devices of each class, but yet retain their advantages.

The instant connector provides a relatively small body so that a patient support and I.V. support are interconnected in immediate adjacency. This allows the I.V. support to be interconnected in a position substantially the same as its normal position adjacent a patient support when it is not connected to that support and yet does not provide any structure on the patient support itself extending above the normal elements to interfere with either patient or patient care activities. Additionally, the I.V. stand is associated in a closely coupled fashion so that it will not contact external structures which the patient support does not contact, to make moving of the interconnected supports substantially the same as moving the patient support itself.

The instant connector is also of a small volume and easily releasably fastenable nature. Most institutional support devices, and especially beds, gurneys and wheelchairs, provide horizontally oriented tubular elements at an elevation of between two and four feet and most I.V. support devices provide a body element comprising a vertical tube extending through the same elevations. Both of these tubular support elements commonly are formed of three-quarter inch diameter stainless steel tubing and if not, of some rigid cylindrical material of a generally similar size. These tubular elements and their spatial relationships allow our connector to be of relatively small volume for close coupling of the horizontal rail to the vertical I.V. pole.

For effective use, an attachment device for I.V. and patient supports must be simple and easily released from and connectable to those support structures. This function is provided by the instant connector not only by reason of its interconnection to portions of both support elements that are readily accessible, but also by the particular fasteners associated with each interconnected support element. The connector arm for a vertical I.V. pole provides similar paired opposed jaw structures movably interconnected so that they may be moved away from each other to allow placement or removal of an I.V. pole and moved toward each other to interconnect the I.V. pole in a positionally maintainable relationship. The horizontal support fastener provides a bracket with a variably sized, wedge shaped channel defined by a first arm partially extending about the top portion of the channel and a spacedly adjacent second arm partially extending about the bottom of the channel so that an elongate tubular member may be placed in the channel by angulating the bracket and may be fastened in that channel by changing the angulation of the bracket to a substantially horizontal position. This bracket is biased to a normal horizontal fastening position by spring means communicating between the connector body and patient support fastener arm, and is manually movable against its bias to an angulated placement and release position.

Our invention resides not in any one of these features per se, but rather in the synergistic combination of all of its structures that give rise to the functions flowing therefrom as herein specified and claimed.

SUMMARY OF INVENTION

Our connector generally provides an elongate structure having a medial body irrotatably interconnecting an I.V. support fastening arm extending in a first direction and pivotally interconnecting a patient support structure fastening arm extending in a second opposite direction. The I.V. support arm provides paired spacedly opposed jaws that are releasably positionable relative to each other to interconnect the vertical support pole of an I.V. stand therebetween. The patient support structure fastening arm provides a bracket having a channel normally extending perpendicular to the jaws of the I.V. support arm and defined by a first arm extending over and downwardly and a spacedly adjacent second arm extending below and upwardly about the channel so that the bracket may be placed about or removed from a horizontal tubular member by pivoting the bracket while the tubular member will be releasably maintained in the channel when the bracket is in a horizontal position. Spring means communicate between the body and the patient support structure fastening bracket to bias the bracket to a horizontal fastening orientation.

In creating such a connector, it is:

A principal object to provide a relatively small device to interconnect a horizontal tubular element of a patient support in immediate adjacency to a vertical tubular element of an I.V. support device.

A further object is to provide such a device that releasably interconnects an I.V. vertical support pole by means of two spacedly adjacent, adjustably movable jaws to accommodate supports of varying size.

A further object is to provide such a device that has a bracket connecting a horizontal tubular member that provides a wedge type, variably sized channel that allows connection, disconnection and positional maintenance of a tubular element of varying size in the channel.

A still further object is to provide such a device that may be positioned to interconnect common patient support structures and I.V. apparatus in current institutional use at a position that is readily accessible to allow easy connection and interconnection of the supports and to maintain them in a position for easy control and manipulation.

A still further object of our invention is to provide such a device that is of new and novel design, of rugged and durable nature, of simple and economic manufacture and otherwise well adapted to the uses and purposes for which it is intended.

Other and further objects of our invention will appear from the following specification and accompanying drawings which form a part hereof. In carrying out the objects of our invention, however, it is to be remembered that its accidental features are susceptible of change in design and structural arrangement with only one preferred and practical embodiment being illustrated in the accompanying drawings as is required.

BRIEF DESCRIPTION DESCRIPTION OF DRAWINGS

In the accompanying drawings which form a part hereof and wherein like numbers of reference refer to similar parts throughout:

FIG. 1 is an isometric view of our connector fastened about a vertical I.V. support pole, with the horizontal support arm pivoted to a position for establishment on a horizontal tubular support element.

FIG. 2 is an isometric view of the same connector as shown in FIG. 1, but with the horizontal support arm moved to a horizontal fastening position about the horizontal tubular support element.

FIG. 3 is an orthographic view from the right side of the apparatus of FIG. 1, with portions of the I.V. pole arm and the body partially cut-away to show internal structure of the body.

FIG. 4 is an orthographic view of the right side of the apparatus of FIG. 2, with portions of the I.V. support pole arm and the body cut-away to show the same internal structure of the body as FIG. 3.

FIG. 5 is an elongate vertical cross-sectional view of the apparatus of FIG. 2, taken on the lines 5—5 in the direction indicated by the arrows thereon.

DESCRIPTION OF PREFERRED EMBODIMENT

Our connector generally provides body 10 irrotatably interconnecting I.V. support pole fastener arm 12 extending therefrom in a first direction and pivotally interconnecting patient support structure fastening arm 11 extending in an opposite direction.

Body 10 provides cylinder 13 defining quadrantal spring chamber 14 with radially outer protruding portion 15 to receive a spring pin and allow assemblage. The chamber 14 is defined to extend inwardly into the body from end 16 proximal to a fastener arm 11 and is covered by the structure of that fastening arm. The radial orientation of chamber 14 is as illustrated to allow the required pivotal motion of the fastening arm 11 as hereinafter described.

The opposite cylinder end 17 that is proximal to fastener arm 12 defines structurally interconnected elongate rectilinear fastening bar 18 extending in an axial direction a spaced distance from the body to provide means for interconnecting fastener arm 12. As shown in FIG. 5, the fastening bar 18 defines medial adjustment bolt hole 19 and fastening pin hole 20 spacedly closer to end 17.

I.V. support fastener arm 12 provides two similar jaw elements, each having straight fastening portion 21 and somewhat "V" shaped jaw portion 22. Fastening portion 21 is of the rectilinear nature illustrated with a configuration substantially the same as the adjacent fastening bar of the body so that the jaw elements extend outwardly from the end of the fastening bar to allow interconnection of a vertical I.V. support pole therebetween. Each body portion defines a medial adjustment bolt hole 23 so configured and positioned as to cooperate with adjustment bolt hole 19 defined in fastening bar 18 to receive adjustment bolt 24 therethrough. This adjustment bolt carries enlarged threadedly engaged knob 25 to allow releasable and adjustable fastening of the two I.V. support fastening arms 21, 22 relative to each other while maintaining those arms on fastening bar 18.

The adjacent surfaces of jaw elements 22 may be covered with sheet-like pad 26 to provide a resilient, higher frictional surface adjacent a vertical I.V. support pole to be carried therebetween to aid fastening and positional maintenance of the jaws on that pole.

Patient support fastener arm 11 provides a bracket having rectangular back 27 carrying two spaced fastening arms 28 and 29 at each end portion to define a fastening channel 30 to contain and positionally maintain a horizontal tubular element. The upper fastening arm 28 provides portion 28a extending over channel 30 to interconnect outwardly angulated depending portion 28b which in turn interconnects somewhat inwardly angulated end portion 28c. The lower fastening arm 29 provides lower portion 29a which structurally supports upwardly and outwardly angulated portion 29b which in turn carries end portion 29c inwardly angulated toward the channel. The fastening arms 28, 29 are similar to each other with the same extension perpendicular to the back 27, and this dimension is substantially equal to the space between the two arms to provide sufficient space for the insertion of a patient support element 38 into the channel 30. The angulated portions 28b, 29b each extend away from back 27 to define a somewhat wedge-shaped channel 30 which allows support elements of somewhat differing cross-sectional size to be carried in the channel in a supported fashion. The surfaces of the arms 28, 29 facing back 27 optionally may be at least partially covered with resilient elements (not shown) to aid positional maintenance of a support element in channel 30.

The medial portion of the body facing surface of back 27 structurally interconnects elongate pivot pin 31 extending a spaced distance therefrom and into pivot pin hole 32 defined in fastening bar 18. The pivot pin defines an annular fastening groove 33 spacedly inwardly of its end portion. Fastening pin hole 20 defined in fastening bar 18 and annular fastening groove 33 are so related positionally and configurationally that fastening pin 34 may be inserted in hole 20 and will then be carried within groove 33 to positionally maintain the pivot pin 31 in fastening bar 18, as illustrated in FIG. 5. Fastening pin 34 has a length substantially the same as the thickness of fastening bar 18 so that it will be contained between fastening portions 21 of the opposed fastening elements of I.V. support fastening arm 12 for positional maintenance.

Torsion spring 35 having end portions 36 extending tangentially therefrom is configured to fit about pivot pin 31 and within spring chamber 14 defined in body 10. The end portions 36 of the torsion spring extend approximately at right angles to each other, as illustrated in FIG. 4, when the spring is in a relaxed condition. Back 27 of support fastener arm 11 carries spring pin 37 extending into spring chamber 14 to contact end portion 36a of the torsion spring upon pivotal motion of fastener arm 11 relative to the body 10. The spring pin is so positioned that in the relaxed condition of the spring when fastener arm 11 horizontal, as illustrated in FIG. 4, the pin will cause no tension in the torsion spring, but will allow motion of the holder arm against the spring bias for establishment of the support fastener arm over a horizontal support element, as illustrated in FIG. 3.

All of the various elements of our connector are formed from some rigid material of appropriate strength and rigidity to allow them to fulfill their purposes. We prefer stainless steel for the patient support and I.V. support fastener arms and one of the more dense polymeric or resinous plastic materials for the body. Resilient frictional pads on the various connecting surfaces of the device are preferably formed of an elastomeric material such as one of the synthetic rubbers. Since the connector will commonly be used in institutional settings such as hospitals, materials of its formation must be compatible with such environs and allow ready cleaning and sterilization when necessary aside from normal durability and strength.

Having thusly described our connector, its use may be understood.

A connector is formed according to the foregoing specification. To assemble the device, pivot pin 31 is inserted through spring 35 and then into pivot pin hole 32 defined in body fastening bar 18, with the spring positioned in spring chamber 14 defined in the body. The fastening pin 34 is then inserted through fastening pin hole 20 and annular fastening grooves 33 in the pivot pin. I.V. support fastener arm 21, 22 are then positioned on fastening bar 18 and fastened by adjustment bolt 24 and knob 25. When the I.V. support fastener arm is positioned and fastened, it will positionally maintain fastening pin 34 in the fastening bar so that it may not be accidentally removed.

Our connector is adapted to interconnected an elongate horizontal structural element 38 of a patient support device to vertical support element 39 of an I.V. support. Normally the connector will be used with patient and I.V. supports that are of mobile nature, especially for interconnecting of such devices during motion, but the connector may also be used to interconnect such apparatus whether either or both members are mobile or stationary. In most patient support devices commonly used in present day institutional care, there is some horizontal or generally horizontally oriented structural element commonly formed of metal tubing of approximately three-quarter inch external diameter. This is especially true of modern hospital beds and gurneys which have tubular side rails at or about the level of the patient support surface and of most wheelchairs that have lateral rails at approximately arm support level and horizontal tubular elements in handlebar structure extending thereabove. These tubular elements may vary in size, but seldom are less than five-eighths inch nor greater than one and one-quarter inches in diameter, and our apparatus will accommodate all tube sizes in this range by reason of the adjustable nature of its support connecting structures.

To install our connector, the horizontal element 38 and vertical element 39 are manually moved into closely spaced adjacency. As shown in FIG. 1 of the drawings, the movable elements of I.V. support fastening arms 12 are loosened sufficiently by adjustment of knob 25 sufficiently that vertical element 39 may be positioned between "V" shaped jaw elements 22. When so positioned, the height of the connector is adjusted on the vertical element 39 so that the arm bracket 11 may contact the adjacent horizontal element 38 and the adjustment knob 25 is then tightened to positionally maintain the connector on the vertical element 39 at this position.

At this point, patient support fastening arm 11 will be maintained by its bias in a horizontal position perpendicular to the axis of vertical support element 39, as shown in FIG. 2 of the drawings. To interconnect the patient support fastening bracket about horizontal element 38, fastening arm 11 is manually pivoted in a clockwise direction, as illustrated in FIG. 1, so that the upper fastening arm moves 28 upwardly and the lower fastening arm 29 moves downwardly. With the fastening bracket in this position, it and the interconnected I.V. support are moved into adjacency with horizontal element 38 so that element 38 moves into the channel 30 between the spaced fastening arms 28, 29, as illustrated in FIG. 1. As this positional relationship is attained, the manual force on fastening arm 11 that maintains its angulated position is released so that the arm returns to its normal biased horizontal position illustrated in FIG. 2. When this relationship is attained, the horizontal element 38 will be releasably carried within channel 30 and the bias generated by torsion spring 35 will be essentially relaxed. In this condition, the connected apparatus will remain releasably interconnected for use.

When it is desired to remove the connector, the placement procedure is merely reversed. The horizontal fastening arm is manually moved to an angulated position, as shown in FIG. 1, and the connector then is moved away from the horizontal element 38 to disassociate that element. The connector then may be released from vertical element 39 by manipulation of the knob 25.

It should be noted that although the placement of our device is described for placement of the I.V. support fastener arm firstly, the device may be placed by firstly placing the patient support fastener arm on horizontal element 38 and then thereafter interconnecting the I.V. fastener arm 12 to vertical element 39, if such type of placement be desired.

The foregoing description of our invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described our invention, what we desire to protect by Letters Patent, and

What we claim is:

1. A device to releasably interconnect an elongate element of an intravenous infusion I.V. support and an elongate element of a patient support device in close adjacency, comprising in combination:

a body having first and second substantially parallel sides with a fastening bar extending from the first side of the body;

an I.V. support fastener arm carried by the fastening bar and having two similar opposed jaw elements extending from the fastening bar with adjustable fastening means communicating between the jaws and through the fastening bar to positionally maintain the jaw elements on an I.V. support; and a patient support structure fastening arm carried on the second side of the body for pivotal motion about an axis substantially perpendicular to the body sides and comprising a bracket having an outer surface defining a channel for containment of an element of a patient support device, said bracket being biased to a first pivotal position for releasably fastening the element of the patient support device but pivotal against such bias to attach and release said element of the patient support device.

2. The device of claim 1 further characterized by the bracket:

having a substantially planar rectilinear back interconnecting spaced fastening arms at the end of each side portion, one said fastening arm extending outwardly from a first side edge of the bracket and spacedly over the outer surface of the bracket and the other said fastening arm extending outwardly from the opposite side edge of the bracket and spacedly over the outer surface of the bracket to define said channel.

3. A device to releasably interconnect an elongate vertically oriented element of an intravenous infusion I.V. support and an elongate horizontally oriented structural element of a patient support device in close adjacency, comprising in combination:

a body having first and second sides and defining a spring chamber communicating from a first side thereof, a pivot pin hole therein communicating with the spring chamber, and an elongate fastening bar extending a spaced distance from the second side of the body;

an I.V. support fastener arm carried by the fastening bar and comprising two similar opposed jaw elements carried on each side of the fastening bar with jaw portions extending outwardly from the fastening bar, with adjustable fastening means communicating between the jaw elements and through the fastening bar to adjust the distance between the jaw elements and positionally maintain the jaw elements on the fastening bar; and a patient support structure fastening arm extending from the second side of the body and comprising a bracket having a back with upper and lower edges interconnecting spaced fastening arms at each end portion, one said fastening arm extending outwardly from the upper edge of the bracket and angularly downwardly and outwardly and the other fastening arm extending outwardly away from the lower edge of the back and angularly upwardly and outwardly to define a channel for fastening a horizontal element of a patient support device, said bracket having a medial pivot pin extending from the side opposite that defining the horizontal support channel, said pivot pin releasably carried in the pivot pin bole defined in the body structure, and spring biasing means carried in the spring chamber to bias the channel defined by the bracket to a horizontal position but allow limited pivotal motion against bias to fasten and release a horizontal element of a patient support.

* * * * *